United States Patent [19]
Paige

[11] 3,965,237
[45] June 22, 1976

[54] DISSOLUTION PROCESS FOR $ZrO_2$-$UO_2$-CaO Fuels

[75] Inventor: Bernice E. Paige, Idaho Falls, Idaho

[73] Assignee: The United States of America as repesented by the United States Energy Research and Development Administration, Washington, D.C.

[22] Filed: Apr. 11, 1975

[21] Appl. No.: 567,216

[52] U.S. Cl................................ 423/4; 252/301.1 R; 423/20
[51] Int. Cl.²....................................... C01G 43/02
[58] Field of Search............ 423/4, 20; 252/301.1 R

[56] References Cited
UNITED STATES PATENTS

| | | | |
|---|---|---|---|
| 3,341,304 | 9/1967 | Newby | 423/4 |
| 3,813,464 | 5/1974 | Ayers | 252/301.1 R |

OTHER PUBLICATIONS

Combustion Engineering, Inc., *Nucl. Sci. Abstr.*, 22, No. 41086, (Oct. 1968).
Bower et al., *Nucl. Sci. Abstr.*, 24, No. 22739, (June 1970).

*Primary Examiner*—Edward A. Miller
*Attorney, Agent, or Firm*—Dean E. Carlson; Arthur A. Churm; Robert J. Fisher

[57] ABSTRACT

The present invention provides an improved dissolution process for $ZrO_2$-$UO_2$-CaO-type pressurized water reactor fuels. The zirconium cladding is dissolved with hydrofluoric acid, immersing the $ZrO_2$-$UO_2$-CaO fuel wafers in the resulting zirconium-dissolver-product in the dissolver vessel, and nitric acid is added to the dissolver vessel to facilitate dissolution of the uranium from the $ZrO_2$-$UO_2$-CaO fuel wafers.

7 Claims, No Drawings

DISSOLUTION PROCESS FOR $ZrO_2$-$UO_2$-CaO FUELS

CONTRACTUAL ORIGIN OF THE INVENTION

The invention described herein was made in the course of or, under, a contract with the U.S. ENERGY RESEARCH AND DEVELOPMENT ADMINISTRATION.

BACKGROUND OF THE INVENTION

This invention relates generally to the reprocessing of spent nuclear reactor fuel elements to recover the fissile material. Particularly the present invention is concerned with the dissolution of the fuel elements as an initial step in the separation and recovery of the fissile materials by liquid extraction techniques. More particularly, the invention concerns the dissolution of pressurized water reactor fuels containing oxide fuel wafers, and specifically concerns the dissolution of zirconium-clad $ZrO_2$-$UO_2$-CaO-type fuel.

As is well known in the art, spent nuclear reactor fuel elements are reprocessed in order to recover the valuable fissionable material for reuse as a nuclear fuel. In the very commonly used liquid extraction reprocessing techniques, the fuel elements are dissolved into solution for subsequent separation of the fissionable material from the fission products, cladding material, etc. and ultimate recovery of the fissionable material. At the head end of such reprocessing schemes, there is generally a dissolver vessel in which is carried out the initial step of dissolving the nuclear reactor fuel elements to place the materials into solution for the subsequent liquid extraction separation steps. A particular nuclear fuel reprocessing facility employing these techniques is the Idaho Chemical Processing Plant located at the Idaho National Engineering Laboratory, formerly named the National Reactor Testing Station, in southeastern Idaho. An understanding of fuel reprocessing and fissile material recovery systems in general, and specifically the system in use at this reprocessing facility, can be obtained from a more detailed discussion contained in U.S. Atomic Energy Commission Report No. IN-1471, entitled "Zirconium Fuel Reprocessing Campaign of 1960", which report is incorporated herein by reference.

One particular type of fuel which must be dissolved in order to permit recovery of the enriched uranium is calcium stabilized uranium dioxide - zirconium dioxide which is used as a pressurized water reactor fuel. This fuel consists of sintered wafers of enriched uranium dioxide - zirconium dioxide - calcium oxide which are clad in zirconium or Zircaloy. These oxide wafers are highly resistant to dissolution in hydrofluoric acid, nitric acid, and other common dissolvents acceptable to aqueous chemical reprocessing.

The dissolution processes employed to date for these wafers have not proved entirely satisfactory. Until the process of the present invention the most successful dissolution process available for these fuels was the dissolution of the cladding material with 7 M hydrofluoric acid and subsequent dissolution of the oxide wafers with concentrated hydrofluoric acid (18 M) with 0.1 M $CrO_3$ used either simultaneously or as a succeeding treatment. However, this fuel dissolution process was less than satisfactory from the standpoint of dissolution time, waste volume and, of utmost importance, corrosion.

In addition, the exposure of the oxide fuel material to the high hydrofluoric acid solution converts the calcium oxide and some of the zirconium oxide to insoluble calcium fluozirconate and the skeletons of the wafers which had been converted to calcium fluozirconate posed a problem in waste handling. One technique for dealing with the calcium fluozirconate remaining after complete dissolution of the uranium oxide and the zirconium metal was to dissolve the material with a dilute solution of sodium hexametaphosphate. However, this required an additional step in the total dissolution process.

While other dissolution processes have been sought, other common dissolvents have been found to be ineffective in the dissolution of the highly resistant fuel wafers. Also it was found that other dissolvents which were found able to attack the fuels, even at extremely slow rates, were highly corrosive to a wide variety of materials of construction.

Consequently, it is an object of the present invention to provide a dissolution process for $ZrO_2$-$UO_2$-CaO-type reactor fuels.

It is another object of the present invention to provide a dissolution process for this type of fuel which proves satisfactory from the standpoint of dissolution time, waste volume produced and total dissolution of the materials present.

A particular object of the present invention is to provide a dissolution process for $ZrO_2$-$UO_2$-CaO-type pressurized water reactor fuels which will provide satisfactory dissolution of the fuel within satisfactory corrosion limits for the dissolver vessel and other processing equipment.

Other objects and advantages of the present invention will become apparent upon reading the following description of the invention.

SUMMARY OF THE INVENTION

In accordance with the present invention, $ZrO_2$-$UO_2$-CaO-type pressurized water reactor fuels are dissolved by immersing the fuel in zirconium-dissolver-product within a dissolver vessel and adding nitric acid to the zirconium-dissolver-product in the dissolver vessel to facilitate dissolution of the fuel. Other aspects of the present invention will be better understood and more appreciated by reading the following detailed description of the invention.

DETAILED DESCRIPTION OF THE INVENTION $ZrO_2$-$UO_2$-CaO fuel is dissolved by immersing the fuel within a dissolver vessel in zirconium-dissolver-product. As used herein, zirconium-dissolver-product is the solution which results from the dissolution of the zirconium or Zircaloy cladding from the reactor fuel with hydrofluoric acid. The zirconium-dissolver-product is a fairly well defined solution whose composition does not very substantially and which is essentially 6.8 M total fluoride with from 1.0 to 1.3 M zirconium. Although other possible steps can be followed to immerse the oxide fuel wafers in the zirconium-dissolver-product, from a practical standpoint, the oxide fuel will become immersed as a result of the dissolution in the dissolver vessel of a complete fuel assembly. In accordance with standard techniques, a fuel assembly of the zirconium-clad $ZrO_2$-$UO_2$-CaO-type fuel is charged to the dissolver vessel. Hydrofluoric acid of about 7 M and preferably 6.8 M is added to the dissolver vessel to dissolve the zirconium cladding. Upon dissolution of the zirconium cladding by the hydrofluoric acid, the $ZrO_2$-$UO_2$-CaO fuel wafers will be exposed and immersed in the resulting zirconium-dissolver-product.

Nitric acid is added to the zirconium-dissolver-product in the dissolver vessel to facilitate the dissolution of the fuel wafers which have been exposed to the solution by the dissolution of the cladding material. The nitric acid added serves as an oxidant which must be added to oxidize and solubilize $UF_4$ as is necessary in any hydrofluoric acid dissolution of high uranium content fuel. The addition of the nitric acid results in the successful complete dissolution of the oxide fuel wafers at an acceptable dissolution rate and without a calcium fluozirconate residual.

The dissolution process of the present invention offers the advantage of reduced corrosion in comparison with previously used processes. Since corrosion of the dissolver vessel and other processing equipment is a prime concern and can be a serious problem as the dissolution can be carried out at a temperature near the boiling point of the dissolvent solution, studies were conducted to determine optimum concentrations of materials in the dissolver solutions which would permit a satisfactory dissolution rate of the fuel materials while minimizing corrosion of the process vessels. The corrosive nature of the dissolvent solutions was found to depend upon both the nitric acid concentration, which preferably ranges between 0.1 M and 0.5 M nitric acid, and the concentration of hydrofluoric acid and zirconium, the ratio of fluoride to zirconium being the determinative factor. The composition of the zirconium-dissolver-product from the continuous dissolution of the fuel (that is, the continuous addition of 6.8 M hydrofluoric acid as the cladding dissolves) is fairly constant, ranging between 4.5 and 6 moles of fluoride per mole of zirconium, because the dissolution essentially stops as the hydrofluoric acid is consumed. Over the ranges of consideration, it was found that the dissolution rate depended upon the values of these components and upon the composition of the fuel as the wafers in different sections of a fuel assembly may contain varying proportions of $UO_2$ and $ZrO_2$. Those fuels which contained a higher proportion of $UO_2$ dissolved faster at a higher nitric acid concentration, while those fuels which contained a higher proportion of zirconium dioxide were found to dissolve at a higher rate with a higher fluoride to zirconium mole ratio. In all the fuels tested, all the uranium was dissolved in 24 hours at a fluoride to zirconium mole ratio of 6.0. While only 40% of the uranium was dissolved in 24 hours at a mole ratio of 5.1, the dissolution was complete within 48 hours.

Additional data showed corrosion rates increased about 50% as nitric acid concentration was increased from 0.1 to 0.5 M. Corrosion rates were tripled when the zirconium concentration was decreased at a constant total fluoride concentration by increasing the amount of free hydrofluoric acid, i.e. increasing the fluoride to zirconium mole ratio. It can be seen that the value of increasing the dissolution rate by increasing the fluoride to zirconium mole ratio and nitric acid concentration must be balanced against the resulting undesirable increased corrosion. Since a reduction in the corrosion of the processing equipment is a prime concern, it is preferred that the dissolution be performed with a lower fluoride to zirconium mole ratio in order to limit corrosion even at the expense of a somewhat slower dissolution rate. Therefore, it is preferred that the fluoride to zirconium ratio be maintained at 4.5 to 5.2. The ratio is maintained in this range to minimize corrosion and yet prevent precipitation of calcium fluozirconate, $CaZrF_6$, which can form at too low a ratio.

A preferred embodiment of the present method includes the step of adding additional hydrofluoric acid to the dissolver solution after a period of time subsequent to the addition of the nitric acid to facilitate dissolution of the $ZrO_2$, since, as the $ZrO_2$ dissolves, the fluoride to zirconium mole ratio decreases which also decreases the rate of dissolution and can cause solution instability. The addition rate of the additional hydrofluoric acid is controlled to prevent excessive corrosion and so as to maintain the ratio at 4.5 to 5.2. Consequently, the preferred concentration are approximately 0.1 M nitric acid with a fluoride to zirconium ratio of about 5.1.

Table I below describes the composition of the dissolving solution present in the dissolver vessel at the various steps in a sample dissolution procedure.

TABLE I

| Component | Fuel Charge | Cladding Dissolvent | Zirconium-Dissolver-Product | Oxidizing Dissolvent For Fuel | Hydrofluoric Acid After About 12 Hrs. | Steady State Dissolver Product |
|---|---|---|---|---|---|---|
| Volume, Liter/Batch | | 636 | 636 | 51 | 198 | 885 |
| Zr, M | | | .3 | | | .3 |
| U, g/l | | | .1 | | | 1.1 |
| F, M | | 6.8 | .8 | | 6.8 | 1.6 |
| H+, M | | .8 | .25 | 6 | 6.8 | .22 |
| $NO_3$, M | | | | 6 | | .3 |
| Cd, g/l | | 2 | 2 | | .2 | 2 |
| FUEL | | | | | | |
| Zircaloy, kg | 94 | | | | | |
| U, kg | 21 | | | | | |
| $ZrO_2$ | 10 | | | | | |
| CaO | .5 | | | | | |
| Boron SS, kg | 1.0 | | | | | |
| Inconel X, kg | 1.6 | | | | | |

Dissolution of fuels in accordance with the present process has proven advantageous in that there is reduced corrosion through the use of lower overall and free hydrofluoric acid concentrations and, in addition, there is a complete dissolution of the fuel materials at satisfactory dissolution rates without the formation of a calcium fluozirconate residual which can pose additional problems in the dissolution procedures.

The embodiments of the invention in which an exclusive property or privilege is claimed are defined as follows:

1. A dissolution process for $ZrO_2$-$UO_2$-CaO-type pressurized water reactor fuels comprising: immersing the $ZrO_2$-$UO_2$-CaO fuel in zirconium-dissolver-product, which is about 6.8 M in fluoride and 1.0 to 1.3 M in zirconium, in a dissolver vessel; and adding nitric acid to said dissolver vessel to facilitate dissolution of the $ZrO_2$-$UO_2$-CaO fuel.

2. The process of claim 1 wherein sufficient nitric acid is added to said dissolver vessel so as to render the resulting dissolvent solution 0.1 M to 0.5 M in nitric acid.

3. The process of claim 2 wherein the dissolvent solution is maintained at a temperature near its boiling point.

4. The process of claim 1 wherein the fluorine to zirconium ratio is maintained between 4.5 and 5.2.

5. The process of claim 1 further comprising: subsequently adding hydrofluoric acid to facilitate dissolution of the $ZrO_2$.

6. The dissolution process of claim 1 wherein a fuel assembly of zirconium clad $ZrO_2$-$UO_2$-CaO-type fuel is charged to the dissolver vessel and hydrofluoric acid is added to the vessel to dissolve the zirconium cladding thereby exposing and immersing the $ZrO_2$-$UO_2$-CaO fuel in the resulting zirconium-dissolver-product; and subsequent to adding nitric acid, adding additional hydrofluoric acid to facilitate dissolution of the $ZrO_2$ from the fuel.

7. The process of claim 6 wherein the hydrofluoric acid initially added is 6.8 Molar.

* * * * *